(12) United States Patent  
Olson

(10) Patent No.: US 7,202,877 B2  
(45) Date of Patent: Apr. 10, 2007

(54) SPRITE RENDERING

(75) Inventor: Thomas Olson, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 103 days.

(21) Appl. No.: 11/135,790

(22) Filed: May 23, 2005

(65) Prior Publication Data

US 2005/0259107 A1 Nov. 24, 2005

Related U.S. Application Data

(60) Provisional application No. 60/573,159, filed on May 21, 2004.

(51) Int. Cl.
*G09G 5/00* (2006.01)
*G06T 7/00* (2006.01)

(52) U.S. Cl. .................... 345/644; 345/582

(58) Field of Classification Search ........ 345/643–644, 345/420

See application file for complete search history.

(56) References Cited

U.S. PATENT DOCUMENTS

| 5,566,073 | A | * | 10/1996 | Margolin | 701/213 |
| 5,848,201 | A | * | 12/1998 | Kajiwara | 382/296 |
| 6,097,437 | A | * | 8/2000 | Hwang | 348/441 |
| 6,760,040 | B2 | * | 7/2004 | Oka | 345/644 |
| 6,970,178 | B2 | * | 11/2005 | Tanioka et al. | 345/643 |
| 6,999,095 | B2 | * | 2/2006 | Wang et al. | 345/582 |
| 7,030,880 | B2 | * | 4/2006 | Tanioka et al. | 345/427 |
| 7,139,005 | B2 | * | 11/2006 | Wang et al. | 345/643 |
| 2003/0071813 | A1 | * | 4/2003 | Chiabrera et al. | 345/426 |
| 2004/0090437 | A1 | * | 5/2004 | Uesaki et al. | 345/420 |
| 2005/0062762 | A1 | * | 3/2005 | Wang et al. | 345/643 |

* cited by examiner

*Primary Examiner*—Mark Zimmerman
*Assistant Examiner*—Crystal Murdoch
(74) *Attorney, Agent, or Firm*—Carlton H. Hoel; W. James Brady; Frederick J. Telecky, Jr.

(57) ABSTRACT

Computation of sprite position and size in JSR-184 with revised modelview matrix made with column vector lengths of original modelview matrix.

5 Claims, 2 Drawing Sheets

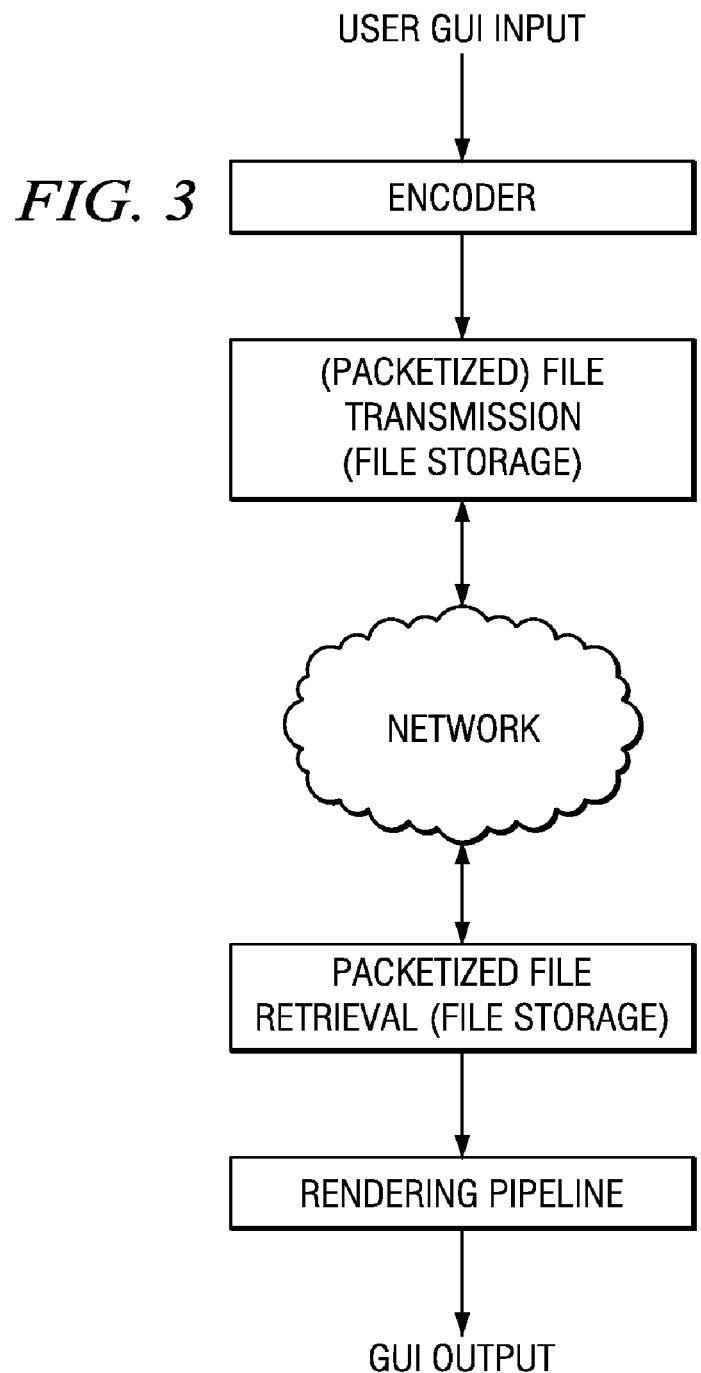

SPRITE RENDERING

CROSS-REFERENCE TO RELATED APPLICATIONS

This application claims priority from provisional application No. 60/573,159, filed May 21, 2004.

BACKGROUND OF THE INVENTION

The present invention relates to computer graphics, and more particularly to rendering.

FIG. 2a illustrates typical stages in computer graphics rendering which generate a two-dimensional image on a screen from an input program that defines a virtual three-dimensional scene. In particular, the application (program) stage includes creation of scene objects in terms of primitives (e.g., small triangles that approximate the surface of a desired object together with attributes such as color and texture); the geometry stage includes manipulation of the mathematical descriptions of the primitives; and the rasterizing stage converts the three-dimensional description into a two-dimensional array of pixels for screen display.

FIG. 2b shows typical functions in the geometry stage of FIG. 2a. Model transforms position and orient models (e.g., sets of primitives such as a mesh of triangles) in model/object space to create a scene (of objects) in world space. A view transform selects a (virtual camera) viewing point and direction for the modeled scene. Model and view transforms typically are affine transformations of the mathematical descriptions of primitives (e.g., vertex coordinates and attributes) and convert world space to eye space. Lighting provides modifications of primitives to include light reflection from prescribed light sources. Projection (e.g., a perspective transform) maps from eye space to clip space for subsequent clipping to a canonical volume (normalized device coordinates). Screen mapping (viewport transform) scales to x-y coordinates for a display screen plus a z coordinate for depth (pseudo-distance) that determines which (portions of) objects are closest to the viewer and will be made visible on the screen. Rasterizing provides primitive polygon interior fill from vertex information; e.g., interpolation for pixel color, texture map, and so forth. Programmable hardware can provide very rapid geometry stage and rasterizing stage processing; whereas, the application stage usually runs on a host general purposed processor. Geometry stage hardware may have the capacity to process 16 vertices in parallel and assemble primitives for output to the rasterizing stage; and the rasterizing stage hardware may have the capacity to process 3 primitive triangles in parallel.

Image-based rendering uses two-dimensional images as primitives rather than models in three-dimensional space. Two-dimensional images avoid most of the processing of the rendering pipeline, and thus speed up processing when usable. Further, image-based rendering allows representation for difficult-to-model objects, such as clouds and fur. Image-based rendering includes varieties such as sprites, billboards, and impostors; see chapter 8 of T. Akenine-Möller and E. Haines, Real-Time Rendering (2d Ed., A K Peters, 2002). In particular, billboarding orients a polygon to face the camera/viewer and renders an image on the polygon analogous to a texture.

Sprite3D (JSR-184) is an extension of the Node class in microedition java and provides image-based rendering:

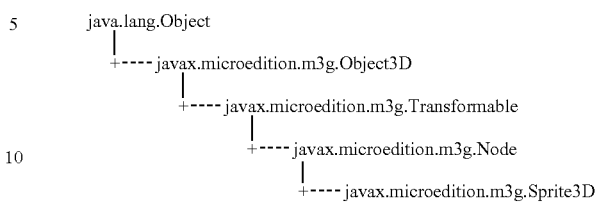

A Sprite3D object includes methods getImage( ) to get the current 2D image and getAppearnace( ) to get the current compositing and fogging attributes of the object. Sprite3D can be implemented with textured rectangles.

Various application programming interfaces (APIs) exist for implementing the rendering pipeline, such as OpenGL and DirectX, and hardware has been designed to support these APIs. For this hardware, input vertices follow a rigidly prescribed series of transformation (geometry stage) that take the vertices from object coordinates to eye space coordinates, to clip coordinates, to normalized device coordinates, and finally to screen coordinates. In order to take advantage of such hardware, applications must map their computations into a form that fits the prescribed series of transformations. In particular, the Sprite3D class of the specification JSR-184 requires vector length computations used to synthesize intermediate points in various coordinate systems, and these computations do not fit the standard rendering pipeline model. Thus there is a problem of implementing JSR-184 sprites on standard graphics hardware.

SUMMARY OF THE INVENTION

The present invention provides methods of image-based rendering of screen-aligned rectangles by revisions of modelview matrices.

Preferred embodiments provide compatibility with commonly-used rendering hardware.

BRIEF DESCRIPTION OF THE DRAWINGS

FIG. 3 illustrates network transmission.

DESCRIPTION OF THE PREFERRED EMBODIMENTS

1. Overview

Figure 1A:
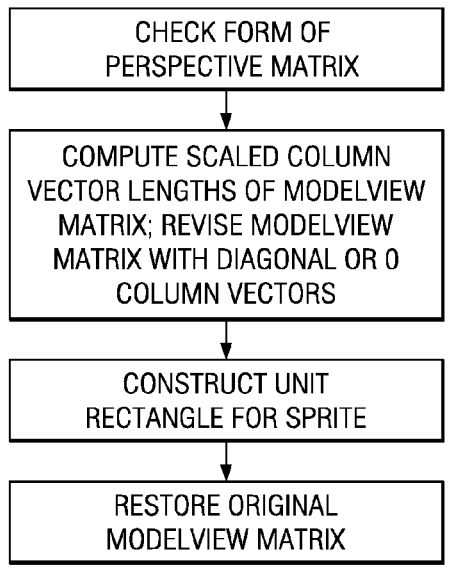
FIGS. 1a–1b are flow diagrams.
Figure 1B:
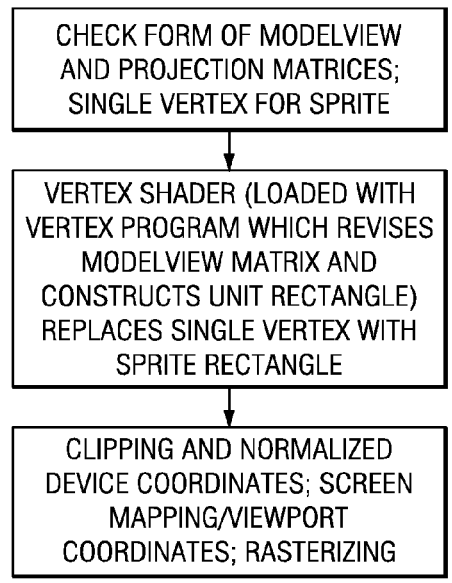
Figure 2A:
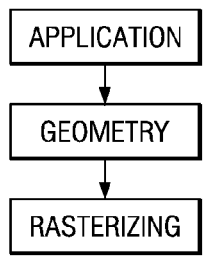
FIGS. 2a–2b show a rendering pipeline.
Figure 2B:
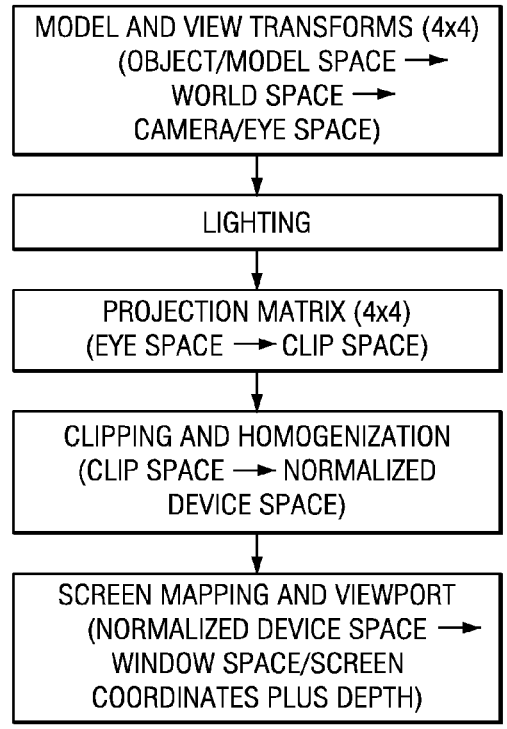

Preferred embodiment methods provide image-based rendering of screen-aligned rectangles by revision of the modelview matrix. A first preferred embodiment revises the modelview matrix to an upper left 3×3 diagonal with elements dx, dy, and 0 where dx is a scaled first column vector length and dy is a scaled second column vector length. An object space rectangle with vertices (±0.5, ±0.5, 0, 0) and texture (2D image) rendered by common rendering hardware gives a screen-aligned rectangle with image. FIG. 1a is a flow diagram; and FIG. 1b illustrates a flow for rendering hardware which includes vertex shaders with vertex generation which can perform the modelview matrix revision and the object space rectangle.

Preferred embodiment systems perform preferred embodiment methods with any of several types of hardware: graphics processor units, digital signal processors (DSPs), general purpose programmable processors, application specific circuits, or systems on a chip (SoC) such as multicore processor arrays or combinations of a DSP and a RISC processor together with various specialized programmable processors such as vertex shaders. A stored program in an onboard or external (flash EEP)ROM or FRAM could implement the signal processing. Analog-to-digital converters and digital-to-analog converters can provide coupling to the analog world; modulators and demodulators (plus antennas for air interfaces) can provide coupling for transmission waveforms; and packetizers can provide formats for transmission over networks such as the Internet as illustrated in FIG. 3.

2. Sprite3D Position and Size

Sprite3D can be implemented with textured rectangles. So first, consider the Sprite3D computations for sprite position and size. Presume the following notation: denote a point p in three dimensions by its three coordinates p=(X, Y, Z); also, let p.X denotes the X coordinate, and similarly for Y and Z coordinates. A homogeneous three-dimensional point has four coordinates, (X, Y, Z, W) where W is a scale factor, and (X, Y, Z, W) corresponds to the non-homogeneous three-dimensional point (X/W, Y/W, Z/W). Note that multiplying a homogeneous point by a scalar gives another homogeneous point which corresponds to the same non-homogeneous point as the original homogeneous point.

Sprite3D has the following steps for computing the sprite position and size:

1) first, transform three homogeneous three-dimensional reference points which lie in the X-Y plane (Z=0) from object space to eye space using the model-view matrix M. M in effect rotates and translates object space to a coordinate system aligned with the direction of view. In particular, take the three reference points to be the origin, (0,0,0,1), the X-axis reference point, (1,0,0,1), and the Y-axis reference point, (0,1,0,1). Denote their transforms as o', x', and y', respectively.

Thus:

$$o' = M \begin{bmatrix} 0 \\ 0 \\ 0 \\ 1 \end{bmatrix} = \begin{bmatrix} m00 & m01 & m02 & m03 \\ m10 & m11 & m12 & m13 \\ m20 & m21 & m22 & m23 \\ m30 & m31 & m32 & m33 \end{bmatrix} \begin{bmatrix} 0 \\ 0 \\ 0 \\ 1 \end{bmatrix} = \begin{bmatrix} m03 \\ m13 \\ m23 \\ m33 \end{bmatrix}$$

$$x' = M \begin{bmatrix} 1 \\ 0 \\ 0 \\ 1 \end{bmatrix} = \begin{bmatrix} m00 & m01 & m02 & m03 \\ m10 & m11 & m12 & m13 \\ m20 & m21 & m22 & m23 \\ m30 & m31 & m32 & m33 \end{bmatrix} \begin{bmatrix} 1 \\ 0 \\ 0 \\ 1 \end{bmatrix} = \begin{bmatrix} m00 + m03 \\ m10 + m13 \\ m20 + m23 \\ m30 + m33 \end{bmatrix}$$

$$y' = M \begin{bmatrix} 0 \\ 1 \\ 0 \\ 1 \end{bmatrix} = \begin{bmatrix} m00 & m01 & m02 & m03 \\ m10 & m11 & m12 & m13 \\ m20 & m21 & m22 & m23 \\ m30 & m31 & m32 & m33 \end{bmatrix} \begin{bmatrix} 0 \\ 1 \\ 0 \\ 1 \end{bmatrix} = \begin{bmatrix} m01 + m03 \\ m11 + m13 \\ m21 + m23 \\ m31 + m33 \end{bmatrix}$$

Thus o' is a translation of the origin.

2) Note if the bottom row of the model-view matrix is not [0 0 0 1], then the w components of o', x', and y' may differ; so scale to the transformed points to make their w components equal to 1. Of course, scaling a homogeneous point does not affect the corresponding three-dimensional point.

3) Compute the (Euclidean) distance in eye space between scaled o' and scaled x' and y':

$$dx = \|x'/x'.w - o'/o'.w\|$$

$$dy = \|y'/y'.w - o'/o'.w\|$$

Recall o'.w denotes the w component of 4-vector o' and similarly for x'.w and y'.w; that is, the divisions are the scalings from step 2). Because the w components are all 1 after scaling, so they cancel and do not disrupt the three-dimensional distance computations.

4) Use dx and dy to construct a set of three points in eye space defining a plane perpendicular to the viewing direction (which was defined by M and is along the z axis in eye space) and containing the transformed origin of object space:

$$O' = o'$$

$$X' = o' + dx \begin{bmatrix} 1 \\ 0 \\ 0 \\ 0 \end{bmatrix}$$

$$Y' = o' + dy \begin{bmatrix} 0 \\ 1 \\ 0 \\ 0 \end{bmatrix}$$

The points X' and Y' in the plane represent the axes from the origin O' with apparent length changes (dx, dy) due to the rotation of object space by M.

5) Transform points O', X', and Y' from eye space to clip space by the 4×4 projection matrix P; this will be used to clip off portions of the image of an object in object space which lie outside of the eventual display (viewport) of the image captured in the view defined by M.

o″=P O'
x″=P X'
y″=P Y'

6) As in step 2), scale these points by their w components to have points with w components all equal to 1:

$$O'' = o''/o''.w$$

$$X'' = x''/x''.w$$

$$Y'' = y''/y''.w$$

7) Compute the (Euclidean) distances between the scaled origin and the scaled reference points (so again the w components cancel):

$$sx = \|X'' - O''\|$$

$$sy = \|Y'' - O''\|$$

8) Use sx and sy to construct a rectangle in normalized device coordinates centered on the projected point o″:

$$p_{lowerleft} = o'' + (-sx/2, -sy/2, 0, 0)$$

$$p_{lowerright} = o'' + (sx/2, -sy/2, 0, 0)$$

$$p_{upperleft} = o'' + (-sx/2, sy/2, 0, 0)$$

$$p_{upperright} = o'' + (sx/2, sy/2, 0, 0)$$

This rectangle is then converted to viewport coordinates and rendered using an application specified texture map.

However, in 3D graphics hardware designed for OpenGL® and Direct3D® vertices input to the renderer follow a rigidly prescribed series of transformations that take them from object coordinates to eye space coordinates, to clip coordinates, to normalized device coordinates, and finally to screen coordinates. In order to take advantage of such hardware, applications must map their computations into a form that fits the prescribed series of transformations. The foregoing JSR-184 computations of intermediate vector lengths do not fit the standard graphics pipeline model, and thus generally will not easily map to standard graphics hardware.

3. First Preferred Embodiment

FIG. 1a is a flow diagram for first preferred embodiment methods of computation for sprite coordinate accomplish those of JSR-184 Sprite3D but avoid the normalizations. In particular, the JSR-184 computations can be recast as follows. Initially, presume the bottom row, [m30, m31, m32, m33], of the modelview matrix, M, has the form [0, 0, 0, k] with k non-zero; then the transformed origin and distances computed in steps 2) and 3) of section 2 reduce to:

$$O' = (m03, m13, m23, m33)$$

$$dx = (m00^2 + m10^2 + m20^2)^{1/2}/k$$

$$dy = (m01^2 + m11^2 + m21^2)^{1/2}/k$$

Next, construct the matrix M' as:

$$M' = \begin{bmatrix} dx & 0 & 0 & m03 \\ 0 & dy & 0 & m13 \\ 0 & 0 & 0 & m23 \\ 0 & 0 & 0 & k \end{bmatrix}$$

Then the normalized O', X', and Y' from step 4) are given by:

$$O' = M' \begin{bmatrix} 0 \\ 0 \\ 0 \\ 1 \end{bmatrix}$$

$$X' = M' \begin{bmatrix} 1 \\ 0 \\ 0 \\ 1 \end{bmatrix}$$

$$Y' = M' \begin{bmatrix} 0 \\ 1 \\ 0 \\ 1 \end{bmatrix}$$

Indeed, M' transforms a point (X, Y, 0) in the Z=0 plane of object space to the scaled point (dx*X, dy*Y, o'.z) in the Z=o'.z plane in eye space.

Furthermore, presume the projection matrix, P, has the form:

$$P = \begin{bmatrix} p00 & 0 & p02 & 0 \\ 0 & p11 & p12 & 0 \\ 0 & 0 & p22 & p23 \\ 0 & 0 & -1 & 0 \end{bmatrix}$$

This is a typical projection matrix and corresponds to the OpenGL function Frustum( ). For such a P, the normalizations of steps 6) and 7) of section 2 are made redundant. In particular, $$o'' = PO' = \begin{bmatrix} p00 & 0 & p02 & 0 \\ 0 & p11 & p12 & 0 \\ 0 & 0 & p22 & p23 \\ 0 & 0 & -1 & 0 \end{bmatrix} \begin{bmatrix} m03 \\ m13 \\ m23 \\ m33 \end{bmatrix}$$

so o".w=m23.

Likewise, $$x'' = PX' = \begin{bmatrix} p00 & 0 & p02 & 0 \\ 0 & p11 & p12 & 0 \\ 0 & 0 & p22 & p23 \\ 0 & 0 & -1 & 0 \end{bmatrix} \begin{bmatrix} dx + m03 \\ m13 \\ m23 \\ m33 \end{bmatrix}$$

Hence, x".w=m23.

Similarly, y".w=m23. Thus the overall computation is:

$$sx = \|X'' - O''\|$$
$$= \|x'' - o''\|/m23$$
$$= \|P(x' - o')\|/m23$$
$$= \left\| P \begin{bmatrix} dx \\ 0 \\ 0 \\ 0 \end{bmatrix} \right\| / m23$$
$$= \left\| \begin{bmatrix} p00*dx \\ 0 \\ 0 \\ 0 \end{bmatrix} \right\| / m23$$
$$= |p00*dx/m23|$$

In the same manner, sy=|p11*dy/m23|. Thus the normalizations are redundant and can be eliminated.

In view of the foregoing, first preferred embodiment methods proceed as follows:

A) Verify that the perspective matrix, P, has the form $$\begin{bmatrix} p00 & 0 & p02 & 0 \\ 0 & p11 & p12 & 0 \\ 0 & 0 & p22 & p23 \\ 0 & 0 & -1 & 0 \end{bmatrix}$$

This can be done during application design, for example by creating the perspective matrix using the OpenGL function glFrustum( ), or at compilation or initialization time.

B) Obtain the current modelview matrix, M, and verify that the bottom row has the form [0 0 0 m33]. This can also be made true by design; for example, it is true for any matrix composed of rotations, translations, scalings, and skewings. It is false when a secondary perspective projection is imposed on the scene, as for reflections and shadow projection. However, sprites are not normally used in such scenes, because the secondary projection usually reveals the sprite for what it is; namely, a two-dimensional rectangle, rather than the three-dimensional object it appears to be from the camera's point of view.

C) Compute dx and dy as the lengths of the vectors defined by the first and second columns, respectively, of M and divided by m33. Note that m33 commonly is equal to 1, so the division may be unnecessary.

D) Construct matrix M' as:

$$M' = \begin{bmatrix} dx & 0 & 0 & m03 \\ 0 & dy & 0 & m13 \\ 0 & 0 & 0 & m23 \\ 0 & 0 & 0 & m33 \end{bmatrix}$$

And install M' as the current modelview matrix. The prior matrix M is saved, such as by glPushMatrix( ).

E) Construct the object space rectangle whose corners are the points
p0=(−0.5, −0.5, 0, 0)
p1=(0.5, −0.5, 0, 0)
p2=(0.5, 0.5, 0, 0)
p3=(−0.5, 0.5, 0, 0) and submit this rectangle to be rendered in the normal way (i.e., geometry and rasterizing stages). The graphics hardware will respond by applying the current matrix (M') followed by the projection matrix P. It will then perform clipping and perspective division, followed by the viewport transform. This will be equivalent to the steps 1)–8) of JSR-184 described in section 2.

F) Restore the original modelview matrix, M, as the current matrix; for example by glPopMatrix( ).

4. Preferred Embodiment Implementation with Vertex Shaders

The method described in section 3 can be implemented in software as part of an implementation of the JSR-184 renderer, using standard graphics library calls for steps A), B), and E). However, a further preferred embodiment implementation is possible for hardware that supports vertex shaders with vertex generation. In vertex shader systems, the geometry engine of the graphics hardware is programmable, and the application program can supply a program to transform the vertices from object space to viewport coordinates and to set their attributes. In systems with vertex generation the number of vertices input to the system can be different from the number of vertices output. That is, the vertex program can choose to emit more or fewer vertices into the rasterization engine than the application submits.

In a vertex shader system, the modelview and perspective matrices are commonly available to the vertex shader as data. In the preferred embodiment instantiation, an application that wishes to draw JSR-184 sprites would load a vertex program for the purpose. The application would handle steps A) and B) (verification of the forms of the modelview and perspective matrices), and do sprite generation in software for the very unusual case where the matrix form is not suitable. In the normal case, it would submit a single vertex to draw a sprite. The vertex program would ignore the input vertex; instead, it would perform steps C) and D). It would then generate the four points specified in step E) and apply the modelview and perspective transforms (optionally composed) to generate clip coordinates. It would submit these four points to the back end for rendering as a quad or as a pair of triangles. (In vertex shader systems, the shader program's responsibility ends when the vertex is transformed to clip coordinates. Clipping and transformation to normalized device and viewport coordinates is handled by dedicated hardware.) FIG. 1b is a flow diagram.

What is claimed is:

1. A method of image-based rendering, comprising:
(a) finding a first length of a first column vector of a first modelview matrix;
(b) finding a second length of a second column vector of said first modelview matrix;
(c) constructing a second modelview matrix with:
(i) a first column vector of said second modelview matrix having components all equal to 0 except the first component equal to the quotient of said first length divided by a fourth component of a fourth column vector of said first modelview matrix;
(ii) a second column vector of said second modelview matrix having components all equal to 0 except the second component equal to the quotient of said second length divided by said fourth component of said fourth column vector of said first modelview matrix;
(iii) a third column vector of said second modelview matrix having components all equal to 0; and
(iv) a fourth column vector of said second modelview matrix equal to said fourth column vector of said first modelview matrix;
(d) constructing an object space rectangle subject to said second modelview matrix; and
(e) rendering said rectangle;
(f) whereby an image associated with said rectangle can be rendered on the rectangle.

2. The method of claim 1, wherein:
(a) after step (d) of claim 1, restoring said first modelview matrix.

3. The method of claim 1, wherein:
(a) said unit rectangle has vertices at the four points (±0.5, ±0.5, 0).

4. The method of claim 1, wherein:
(a) said steps (a)–(d) are implemented as a vertex shader program for a graphics processing unit.

5. The method of claim 1, wherein:
(a) said image of (f) of claim 1 is a texture.

* * * * *